United States Patent [19]
Martin

[11] Patent Number: 5,561,911
[45] Date of Patent: Oct. 8, 1996

[54] LEVEL TOOL WITH LASER LIGHT ALIGNMENT CAPABILITIES

[76] Inventor: Jeffrey J. Martin, 58 Via Diego, San Lorenzo, Calif. 94580

[21] Appl. No.: 375,583

[22] Filed: Jan. 19, 1995

[51] Int. Cl.⁶ ............................. G01C 9/24; G01C 15/00
[52] U.S. Cl. ................. 33/365; 33/379; 33/290; 33/471; 33/DIG. 21
[58] Field of Search ................... 33/348.2, 374, 33/375, 365, 471, DIG. 21, 379, 290, 370

[56] References Cited

U.S. PATENT DOCUMENTS

| | | | |
|---|---|---|---|
| 2,535,791 | 12/1950 | Fluke | 33/DIG. 21 |
| 2,877,555 | 3/1959 | Visockis | 33/290 X |
| 3,499,225 | 3/1970 | Darrah | 33/379 |
| 3,897,637 | 8/1975 | Genho | 33/DIG. 21 |
| 4,733,477 | 3/1988 | Fincham et al. | 33/471 X |
| 5,020,232 | 6/1991 | Whiteford | 33/348.2 |

FOREIGN PATENT DOCUMENTS

| | | | |
|---|---|---|---|
| 0401815 | 12/1990 | Germany | 33/DIG. 21 |
| 91/02217 | 2/1991 | WIPO | 33/DIG. 21 |

*Primary Examiner*—Alvin Wirthlin

[57] ABSTRACT

A level tool with laser light alignment capabilities including a straight rigid first rail having a leveling vial coupled thereto; a laser light source coupled to the first rail and with the laser light source transmitting a laser beam that is longitudinally aligned with the first rail to a remote location for use in alignment operations; and an electrical power supply coupled to the first rail for providing electrical energy to the laser light source for operation.

7 Claims, 3 Drawing Sheets

LEVEL TOOL WITH LASER LIGHT ALIGNMENT CAPABILITIES

BACKGROUND OF THE INVENTION

1. Field of the Invention

The present invention relates to a level tool with laser light alignment capabilities and more particularly pertains to allowing leveling operations to be readily performed with a level tool with laser light alignment capabilities.

2. Description of the Prior Art

The use of leveling tools is known in the prior art. More specifically, leveling tools heretofore devised and utilized for the purpose of performing leveling operations are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,897,637 to Genho discloses a laser level and square. U.S. Pat. No. 4,993,161 to Borkovitz discloses a laser beam level instrument. U.S. Pat. No. 5,144,487 to Hersey discloses a portable laser device for alignment tasks. U.S. Pat. No. 5,075,977 to Rando discloses an automatic plumb and level tool. U.S. Pat. No. 5,182,863 to Rando discloses an automatic plumb and level tool with acoustic measuring capability.

While these devices fulfill their respective, particular objective and requirements, the aforementioned patents do not describe a level tool with laser light alignment capabilities that allows alignment operations to be performed using a combination of conventional and laser light leveling mechanisms.

In this respect, the level tool with laser light alignment capabilities according to the present invention substantially departs from the conventional concepts and designs of the prior art, and in doing so provides an apparatus primarily developed for the purpose of allowing leveling operations to be readily performed.

Therefore, it can be appreciated that there exists a continuing need for new and improved level tool with laser light alignment capabilities which can be used for allowing leveling operations to be readily performed. In this regard, the present invention substantially fulfills this need.

SUMMARY OF THE INVENTION

In the view of the foregoing disadvantages inherent in the known types of leveling tools now present in the prior art, the present invention provides an improved level tool with laser light alignment capabilities.

To attain this, the present invention essentially comprises, in combination, a straight rigid long horizontal first rail having a first end with a protractor formed thereon spanning 180 degrees, a second free end, a horizontal leveling vial coupled thereto near the first end, a vertical leveling vial coupled thereto near the second end, and an oblong recess formed thereon between the vials and with the recess thereby defining a handle for allowing a user a firm grip. The first rail further has a pair of opposed faces and a pair of edges extended between the faces to define a generally rectangular cross-section. Each edge further has an elongated slot with a V-shaped cross-section formed thereon. The first rail additionally has an open first chamber formed thereon between the handle and the vertical leveling vial and an open second chamber formed thereon in communication between the first chamber and one of the slots.

A straight rigid short second rail is included and has a first end rotatably coupled to the first end of the first rail for 180 degree movement with respect thereto, a second free end, a leveling vial coupled thereto, and a tick mark formed thereon near the first end associated with the protractor of the first rail for allowing angular positioning of the second rail to be specifically set within the 180 degree span of the protractor. The second rail further has a pair of opposed faces and a pair of edges extended between the faces to define a generally rectangular cross-section. Each edge further has a slot with a V-shaped cross-section formed thereon.

A laser light source is provided and disposed within the second chamber of the first rail. The laser light source is positioned in alignment with the corresponding slot adjacent to the second chamber. The laser light source has an illuminating end facing the free end of the first rail and with the illuminating end having a lens coupled thereto for allowing a collimated laser beam to be transmitted along and within the slot and exit from the free end of the first rail for projection upon a recipient external surface at a remote location for use in alignment operations.

A battery is included and removably disposed within the first chamber for providing electrical energy to the laser light source for operation. A power switch is also included and coupled between the battery and laser light source. The power switch has one orientation for transmitting electrical energy to the laser light source and another orientation for preventing such transmission. Lastly, a rigid cover plate is disposed over the first chamber and coupled to the first rail. The cover plate has a recessed portion formed thereon that is extended about the power switch.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the

3 invention of the application, which is measured by the claims, nor is it intended to be limiting as to the scope of the invention in any way.

It is therefore an object of the present invention to provide a new and improved level tool with laser light alignment capabilities which may be easily and efficiently manufactured and marketed.

It is a further object of the present invention to provide a new and improved level tool with laser light alignment capabilities which is of durable and reliable construction.

An even further object of the present invention is to provide a new and improved level tool with laser light alignment capabilities which is susceptible of a low cost of manufacture with regard to both materials and labor, and which accordingly is then susceptible of low prices of sale to the consuming public, thereby making such a level tool with laser light alignment capabilities economically available to the buying public.

Even still another object of the present invention is to provide a new and improved level tool with laser light alignment capabilities for allowing leveling operations to be readily performed.

Lastly, it is an object of the present invention to provide a new and improved level tool with laser light alignment capabilities comprising a straight rigid first rail having a leveling vial coupled thereto; a laser light source coupled to the first rail and with the laser light source transmitting a laser beam that is longitudinally aligned with the first rail to a remote location for use in alignment operations; and an electrical power supply coupled to the first rail for providing electrical energy to the laser light source for operation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

4

DESCRIPTION OF THE PREFERRED EMBODIMENT

Figure 1:
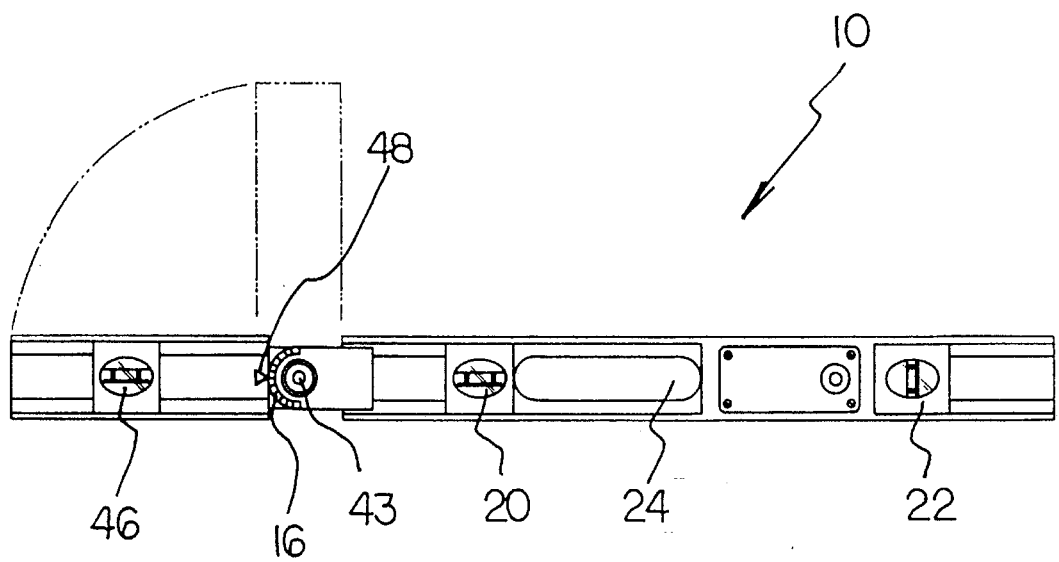
FIG. 1 is a side-elevational view of the preferred embodiment constructed in accordance with the principles of the present invention shown with its short rail in an extended linear and right-angle configuration.

With reference now to the drawings, and in particular, to FIG. 1 thereof, the preferred embodiment of the new and improved level tool with laser light alignment capabilities embodying the principles and concepts of the present invention and generally designated by the reference number 10 will be described.

The present invention is comprised of a plurality of components. In their broadest context, such components include a pair of rails with leveling vials, a laser light source, and a battery. Such components are individually configured and correlated with respect to each to provide the intended function of performing alignment operations.

Figure 2:
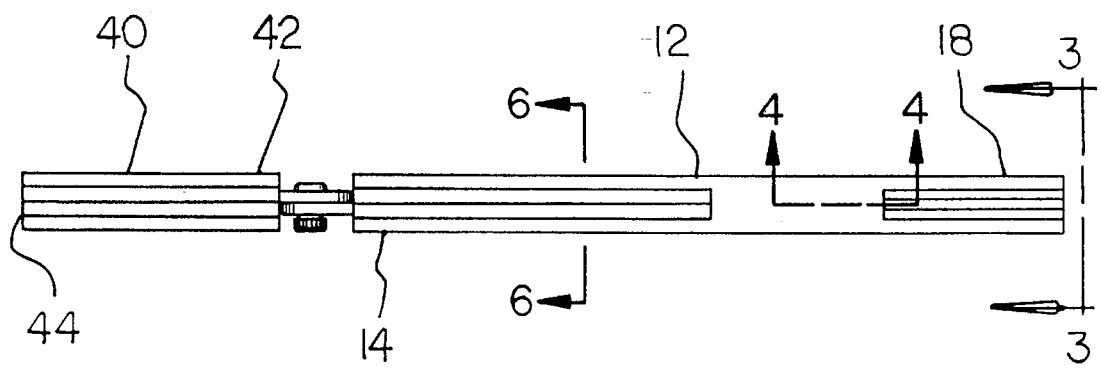
FIG. 2 is a plan view of the present invention in a linear configuration.

Specifically, the present invention includes a first rail 12. The first rail is straight and long in structure. It is formed of a rigid material such as metal or plastic. As shown in FIGS. 1 and 2, the first rail has a first end 14 with a protractor 16 formed thereon. The protractor spans a sector of about 180 degrees. The first rail also has a second free end, a horizontal leveling vial 20 coupled thereto near the first end, and a vertical leveling vial 22 coupled thereto near the second end. The leveling vials are of the commercial bubble type. The first rail also has an oblong recess formed thereon between the leveling vials and with the recess thereby defining a handle 24 for allowing the user a firm grip.

Figure 3:
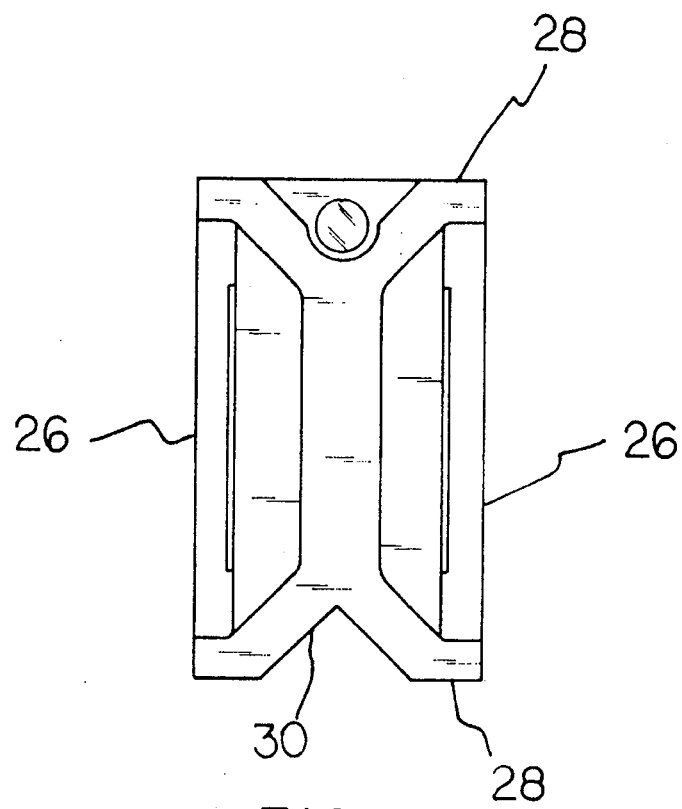
FIG. 3 is a view of the present invention taken along the line 3—3 of FIG. 2.
Figure 4:
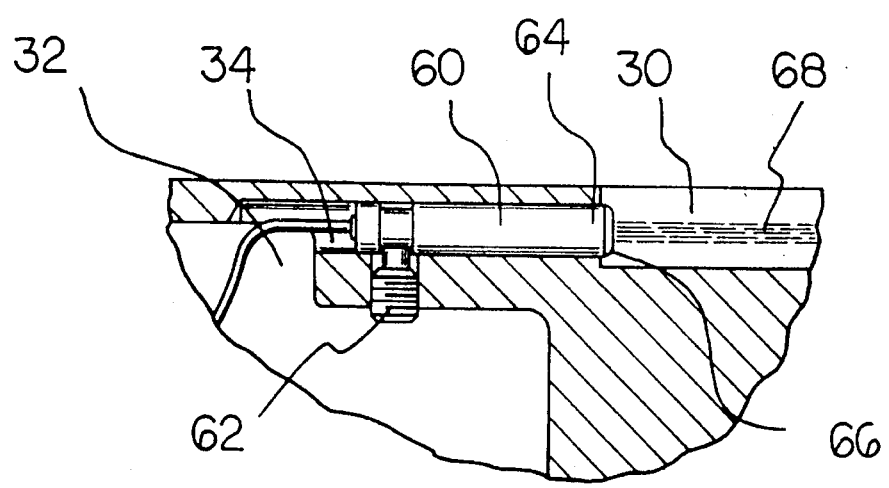
FIG. 4 is a cross-sectional view of the present invention taken along the line 4—4 of FIG. 2.
Figure 5:
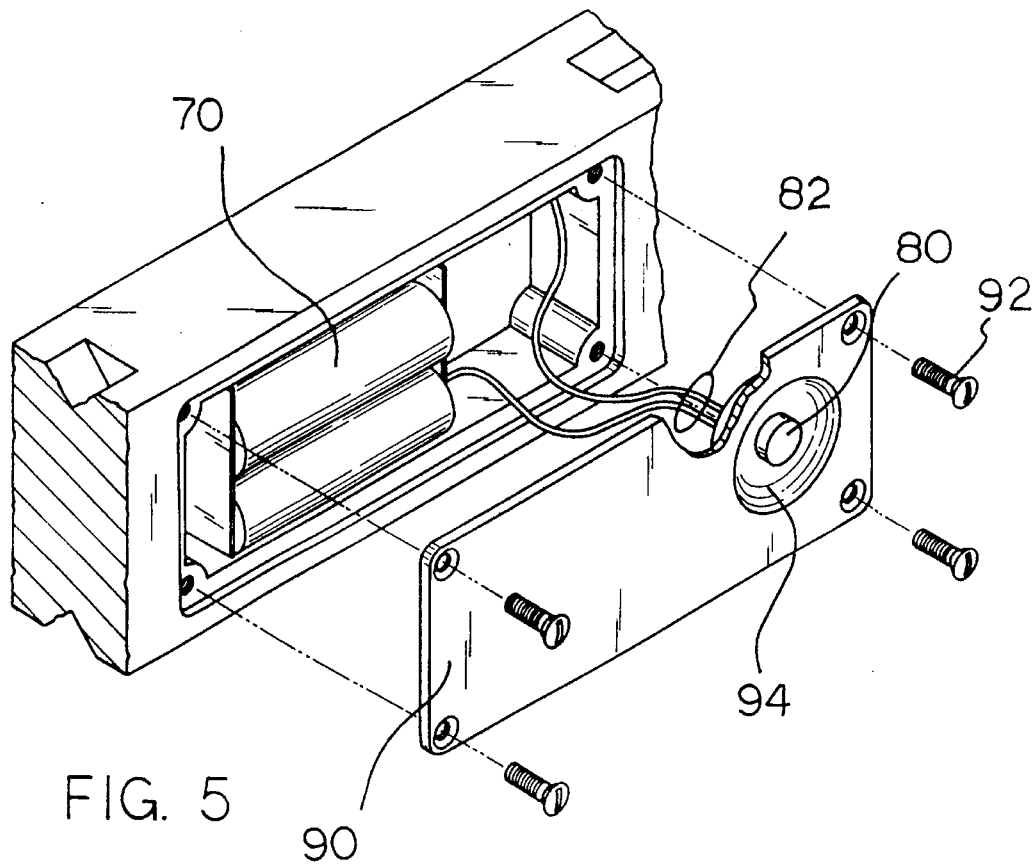
FIG. 5 is an enlarged exploded view of the first compartment within the long first rail and the batteries disposed therein as well as the power switch extended therefrom.

As best illustrated in FIG. 3, the first rail includes a pair of opposed faces 26 and a pair of edges 28 perpendicularly extended between the faces to define a generally rectangular cross-section. Each edge of the first rail further has an elongated slot 30 with a v-shaped cross-section formed longitudinally therealong. In addition, the first rail has an open first chamber 32 as shown in FIGS. 4 and 5. The first chamber is formed on the first rail between the handle 34 and vertical leveling vial 22. Lastly, the first rail includes an open second chamber 34. The second chamber is formed on the rail and is placed in communication between the first chamber 32 and one of the slots 30 as best illustrated in FIG. 4.

Figure 6:
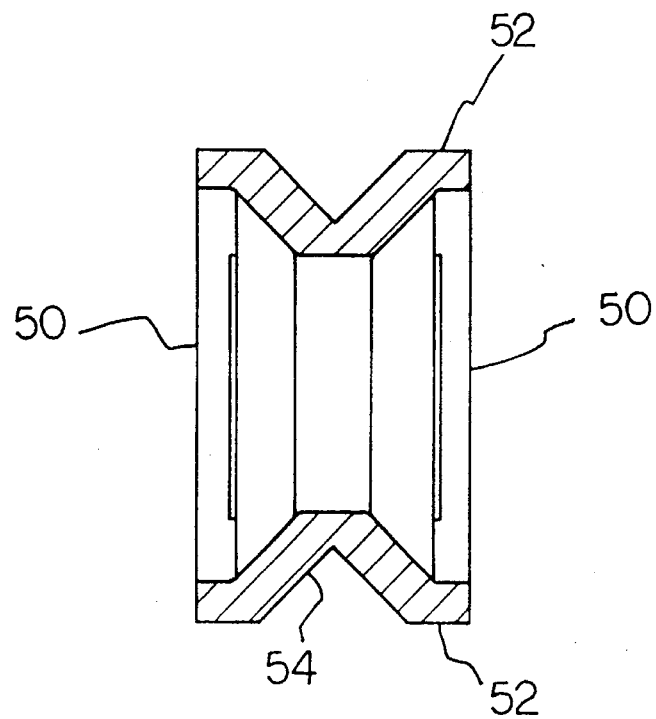
FIG. 6 is a cross-sectional view of the present invention taken along the line 6—6 of FIG. 2.

The present invention also includes a second rail 40 as shown in FIG. 2. The second rail is straight and formed of a rigid material such as metal or plastic. The second rail has a length less than the length of the first rail. The second rail has a first end 42 rotatably coupled to the first end 14 of the first rail 12 with bolt 43 for 180 degree movement as shown in FIG. 1. The second rail also has a second free end 44, a leveling vial 46 coupled thereto, and tick mark 48 formed thereon near the first end. The tick mark is associated with the protractor 16 of the first rail for allowing angular positioning of the second rail to be specifically set within the 180 degree span of the protractor. As best illustrated in FIG. 6, the second rail includes a pair of opposed faces 50 and a pair of edges 52 perpendicularly extended between the faces to define a generally rectangular cross-section. Each edge of the second rail has a slot 54 formed thereon. Each slot has a v-shaped cross-section. The slots thus allow the short rail and the long rails to be placed upon cylindrical components such as piping for alignment operations.

An electrically-energizable laser light source 60 as shown in FIG. 4 is disposed within the second chamber of the first rail. The laser light source is positioned in alignment with the corresponding slot 30. The laser light source is secured within the second chamber with a threaded fastener 62. The laser light source is generally tubular in structure and has an illuminating end 64 facing the free end 18 of the first rail. The illuminating end of the laser light source has a lens 66 coupled thereto. The lens allows a collimated laser beam 68 to be transmitted along and within the slot when the laser light source is electrically energized. The beam then exits from the free end 18 of the first rail for projection upon a recipient external surface such as a wall at a remote location for use in alignment operations.

The laser light source is powered by a battery 70. The battery is removably disposed within the first chamber as shown in FIG. 5. The battery is conventional in design and commercially available.

The present invention also includes a depressible power switch 80 as shown in FIG. 5. The power switch is coupled between the battery 70 and the laser light source 60 using electrical leads 82. The power switch has one orientation for allowing electrical energy from the battery to be transmitted from the laser light source. The power switch also has another orientation for preventing such transmission of electrical energy to the laser light source.

Lastly, a cover plate 90 is provided. The cover plate is generally rectangular and formed of a rigid material such as metal or plastic. The cover plate is disposed over the first chamber to seal the battery 70 and power switch 80 within the first rail. The cover plate is then coupled to the first rail using threaded bolts 92. The cover plate also has a recessed portion 94 formed thereon. The recessed portion is extended about the power switch and places the power switch in an alcove. Thus, the present invention can be placed flush on its side without the power switching causing interference.

The present invention is a combination of a battery-powered laser and a level/protractor. The present invention is used in buildings or homes during construction or remodeling. The present invention is positioned on a wall, floor, ceiling, or column using the built-in bubble vials. The laser light source of the present invention is used in conjunction with the rails for performing measurements with respect to angles or inclinations. The laser light source projects a bright red dot on virtually any surface up to 150 feet away from where a support, wall, or similar building structure would connect. In the preferred embodiment, the laser light source produces 5 milliwatts of output power at a wavelength of about 670 nanometers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A level tool with laser light alignment capabilities comprising, in combination:

a straight rigid long horizontal first rail having a first end with a protractor formed thereon spanning 180 degrees, a second free end, a horizontal leveling vial coupled thereto near the first end, a vertical leveling vial coupled thereto near the second end, and an oblong recess formed thereon between the vials and with the recess thereby defining a handle for allowing a user a firm grip, the first rail further having a pair of opposed faces and a pair of edges extended between the faces to define a generally rectangular cross-section and with each edge further having an elongated slot with a V-shaped cross-section formed thereon, the first rail additionally having an open first chamber formed thereon between the handle and the vertical leveling vial and an open second chamber formed thereon in communication between the first chamber and one of the slots;

a straight rigid short second rail having a first end rotatably coupled to the first end of the first rail for 180 degree movement with respect thereto, a second free end, a leveling vial coupled thereto, and a tick mark formed thereon near the first end and associated with the protractor of the first rail for allowing angular positioning of the second rail to be specifically set within the 180 degree span of the protractor, the second rail further having a pair of opposed faces and a pair of edges extended between the faces to define a generally rectangular cross-section and with each edge having a slot with a V-shaped cross-section formed thereon;

a laser light source disposed within the second chamber of the first rail and positioned in alignment with the corresponding slot, the laser light source having an illuminating end facing the free end of the first rail and with the illuminating end having a lens coupled thereto for allowing a collimated laser beam to be transmitted along and within the slot and exit from the free end of the first rail for projection upon a recipient external surface at a remote location for use in alignment operations;

a battery removably disposed within the first chamber for providing electrical energy to the laser light source for operation;

a power switch coupled between the battery and laser light source and with the power switch having one orientation for transmitting electrical energy to the laser light source and another orientation for preventing such transmission; and a rigid cover plate disposed over the first chamber and coupled to the first rail and with the cover plate having a recessed portion formed thereon and extended about the power switch.

2. A level tool with laser light alignment capabilities comprising:

a straight rigid first rail having a leveling vial coupled thereto, the first rail including a pair of opposed faces and a pair of edges extended between the faces to define a generally rectangular cross-sectional shape of the first rail, with one of the edges including an elongated slot of V-shaped cross-section formed therein and extending through an outer end of the first rail;

a laser light source coupled to the first rail and with the laser light source transmitting a laser beam that is longitudinally aligned with the first rail to a remote location for use in alignment operations, the laser light source being aligned with the elongated slot of the first rail so as to project laser light parallel to and longitudinally through the elongated slot to a point beyond the outer end of the first rail; and an electrical power supply coupled to the first rail for providing electrical energy to the laser light source for operation.

3. The level tool with laser light alignment capabilities as set forth in claim 2 wherein the first rail has an oblong recess formed thereon defining a handle for allowing a user a firm grip.

4. The level tool with laser light alignment capabilities as set forth in claim 2 further including a straight second rail pivotally coupled to an end of the first rail.

5. The level tool with laser light alignment capabilities as set forth in claim 2 further including:

- a straight second rail pivotally coupled to an end of the first rail; and
- a measurement mechanism coupled between the first rail and second rail for allowing an angle formed therebetween to be accurately set.

6. The level tool with laser light alignment capabilities as set forth in claim 2 further including a power switch coupled between the battery and laser light source and with the power switch having one orientation for transmitting electrical energy to the laser light source and another orientation for preventing such transmission.

7. The level tool with laser light alignment capabilities as set forth in claim 2 further including a straight second rail pivotally coupled to an end of the first rail and with the second rail further having a pair of opposed faces and a pair of edges extended between the faces to define a generally rectangular cross-section and one of the edges having a slot with a V-shaped cross-section formed thereon.

* * * * *